United States Patent
Kuliner et al.

(10) Patent No.: US 8,009,648 B2
(45) Date of Patent: Aug. 30, 2011

(54) MOBILE AD HOC NETWORK WITH ISOSYNCHRONOUS COMMUNICATIONS AND RELATED METHODS

(75) Inventors: Mitel Kuliner, Rochester, NY (US); David Chauncey, Fairport, NY (US)

(73) Assignee: Harris Corporation, Melbourne, FL (US)

( * ) Notice: Subject to any disclaimer, the term of this patent is extended or adjusted under 35 U.S.C. 154(b) by 704 days.

(21) Appl. No.: 12/117,096

(22) Filed: May 8, 2008

(65) Prior Publication Data

US 2009/0279463 A1 Nov. 12, 2009

(51) Int. Cl.
*H04W 4/00* (2009.01)
*H04J 3/24* (2006.01)
*H04L 12/66* (2006.01)

(52) U.S. Cl. .................. 370/338; 370/349; 370/352

(58) Field of Classification Search .................. None
See application file for complete search history.

(56) References Cited

U.S. PATENT DOCUMENTS

| | | | |
|---|---|---|---|
| 6,665,301 B1 | 12/2003 | Wu | 370/395 |
| 6,832,091 B1 | 12/2004 | Sugaya | 455/450 |
| 6,865,150 B1 | 3/2005 | Perkins et al. | 370/230 |
| 6,873,854 B2 | 3/2005 | Crockett et al. | 455/518 |
| 7,085,290 B2 | 8/2006 | Cain et al. | 370/469 |
| 7,215,959 B2 | 5/2007 | Creamer et al. | 455/436 |
| 7,216,282 B2 | 5/2007 | Cain | 714/752 |
| 7,221,660 B1 | 5/2007 | Simonson et al. | 370/312 |
| 7,221,663 B2 | 5/2007 | Rodman et al. | 370/329 |
| 7,222,051 B2 | 5/2007 | Makagon et al. | 715/727 |
| 7,224,687 B2 | 5/2007 | Shah et al. | 370/352 |
| 7,225,226 B2 | 5/2007 | Fitzpatrick et al. | 709/205 |
| 7,283,487 B2 | 10/2007 | Wu | 370/257 |
| 7,724,743 B2 * | 5/2010 | Razdan et al. | 370/392 |
| 7,733,861 B2 * | 6/2010 | Suga | 370/392 |
| 7,752,276 B2 * | 7/2010 | Aschauer et al. | 709/206 |
| 7,783,704 B2 * | 8/2010 | Acharya et al. | 709/204 |
| 2002/0001337 A1 | 1/2002 | Chauncey et al. | 375/132 |
| 2004/0132452 A1 * | 7/2004 | Lee | 455/445 |
| 2006/0174288 A1 | 8/2006 | Bichot et al. | 725/81 |
| 2006/0176813 A1 * | 8/2006 | Santhanankrishnan | 370/230 |
| 2007/0171845 A1 * | 7/2007 | Yang et al. | 370/254 |
| 2007/0280136 A1 * | 12/2007 | Chen et al. | 370/254 |
| 2008/0062987 A1 * | 3/2008 | Elmasry | 370/392 |
| 2009/0238170 A1 * | 9/2009 | Rajan et al. | 370/352 |

FOREIGN PATENT DOCUMENTS

| | | |
|---|---|---|
| GB | 2423893 | 9/2006 |
| WO | 02/069571 | 9/2002 |
| WO | 2005/096553 | 10/2005 |
| WO | 2006/124221 | 11/2006 |

OTHER PUBLICATIONS

Chapter N9. How to setup an Intranet, pp. 1-10.
Francis Rumsey, John Watkinson, "Digital Interface Handbook", Third Edition, pp. 8-9.
G.729 Article, http://en.wikipedia.org/wiki/G.729, p. 1.
Ichien et al., "Isochronous MAC Using Long-Wave Standard Time Code for Wireless Sensor Networks", Communications and Electronics, First International Conference on IEEE, Oct. 1, 2006, pp. 378, 379, 382.

* cited by examiner

*Primary Examiner* — Chi Pham
*Assistant Examiner* — Soon-Dong Hyun
(74) *Attorney, Agent, or Firm* — Allen, Dyer, Doppelt, Milbrath & Gilchrist, P.A.

(57) ABSTRACT

A mobile ad hoc network (MANET) may include a plurality of mobile nodes. Each mobile node may include a wireless transceiver and a controller cooperating therewith for exchanging isosynchronous Internet Protocol (IP) communications with at least one adjacent mobile node. The isosynchronous IP communications may comprise at least one of voice communications and data communications.

18 Claims, 3 Drawing Sheets

MOBILE AD HOC NETWORK WITH ISOSYNCHRONOUS COMMUNICATIONS AND RELATED METHODS

FIELD OF THE INVENTION

The present invention relates to the field of communications networks, and, more particularly, to mobile ad hoc networks and related methods.

BACKGROUND OF THE INVENTION

Wireless networks have experienced increased development in the past decade. One of the most rapidly developing areas is mobile ad hoc networks (MANETs). Physically, a MANET includes a number of geographically distributed, potentially mobile nodes sharing one or more common radio channels. Compared with other types of networks, such as, cellular networks or satellite networks, the most distinctive feature of MANETS is the lack of any fixed infrastructure. The network is formed of mobile (and potentially stationary) nodes, and is created on the fly as the nodes communicate with each other. The network does not depend on a particular node and dynamically adjusts as some nodes join or others leave the network.

An improvement in MANETs is disclosed in U.S. Pat. No. 7,216,282 to Cain, assigned to the present application's assignee. Cain discloses a MANET that may include a source node, a destination node, and a plurality of intermediate nodes. The source node may establish a plurality of routes to the destination node for transferring data therebetween, where each route passes through at least one of the intermediate nodes. The source node may also encode a plurality of data packets using a forward error correction (FEC) encoding algorithm to generate error correction data for the data packets, interleave the data packets and error correction data, and distribute and send the interleaved data packets and error correction data across the routes to the destination node. Furthermore, the destination node may receive and deinterleave the interleaved data packets and error correction data. The destination node may also decode the data packets based upon the error correction data using an FEC decoding algorithm to correct compromised data packets.

Another improvement in MANETs is disclosed in U.S. Pat. No. 7,085,290 to Cain et al., also assigned to the present application's assignee. Cain et al. discloses a MANET that may include a plurality of mobile nodes, each including a wireless communications device and a controller connected thereto. At an upper protocol layer, the controller may establish a quality-of-service (QoS) threshold. At an intermediate protocol layer, the controller may select at least one route for transmitting data to at least one destination mobile node based upon the QoS threshold, and determine whether a QoS metric for the selected route falls below the threshold. At a lower protocol layer, the controller may cooperate with the wireless communications device to transmit data to the at least one destination mobile node via the at least one selected route, and cooperate with the wireless communications device at the lower protocol layer to adjust signal transmission power, pattern, and/or gain based upon a determination that the QoS metric has fallen below the QoS threshold.

A typical communications system may sometimes include an approach to scheduling communications between a transmitter device and a receiver device, i.e. a isosynchronous communications system rather than an asynchronous communications system. The isosynchronous communications system, for example, a voice over Internet Protocol (VoIP) system, transmits data for delay sensitive applications. Advantageously, isosynchronous communications systems provide for continuous synchronous transmission of bits. The transmission is divided into samples, each sample being encapsulated in a packet payload. The delay between each sample may be tolerated depending on the communications system. QoS demands in the isosynchronous communications system may be dependent on low latency high quality connections. Indeed, in typical VoIP protocols, for example, the Session Initiation Protocol and the H.323 protocol, a central server is used to manage the communications therebetween. Because of the infrastructureless and temporary nature of MANETs, isosynchronous communications, more particularly, VoIP, in MANETs may be problematic.

SUMMARY OF THE INVENTION

In view of the foregoing background, it is therefore an object of the present invention to provide a mobile ad hoc network (MANET) for effective communications.

This and other objects, features, and advantages in accordance with the present invention are provided by a MANET comprising a plurality of mobile nodes. Each mobile node may comprise a wireless transceiver and a controller cooperating therewith for exchanging isosynchronous Internet Protocol (IP) communications with at least one adjacent mobile node. The isosynchronous IP communications may comprise at least one of voice communications and data communications. Advantageously, the mobile nodes of the MANET may exchange isosynchronous voice and data communications with each other. Since the mobile nodes may exchange isosynchronous IP data, services that use synchronized continuous transmission, for example, VoIP, may be implemented within the MANET.

Moreover, the wireless transceiver and controller may further cooperate to transmit a connection message for registering with the at least one adjacent mobile node and to enter an active communication mode upon completion of the registering. Also, the wireless transceiver and controller may further cooperate to periodically transmit a keepalive message to the at least one adjacent mobile node.

Furthermore, the controller may store a list of other adjacent mobile nodes in the active communication mode based upon the completion of registering and the keepalive message. The wireless transceiver and controller of at least one of the plurality of mobile nodes may further cooperate to enter a low power consumption mode when the keepalive message is not received during a set period of time.

More particularly, the plurality of mobile nodes may comprise a source node, a destination node, and at least one intermediate node therebetween. The source node may transmit a transmission request message by way of the at least one intermediate node to the destination node. The destination node may initialize the isosynchronous IP communications with the source node by way of the at least one intermediate node based upon receipt of the transmission request message. Additionally, at least one of the source and destination nodes may send a transmission end message by way of the at least one intermediate node to end the isosynchronous IP communications.

For example, the controller may comprise a real time communications (RTC) subprocessor. The controller may also comprise a voice compression codec subprocessor. The isosynchronous IP communications may be based upon at least one of Session Initiation Protocol (SIP), H.323 communications protocol, Media Gateway Control Protocol (MGCP), and push-to-talk (PTT).

Another aspect is directed to a method for operating a mobile node in a MANET. The mobile node may comprise a wireless transceiver, and a controller cooperating therewith. The method may include exchanging isosynchronous Internet Protocol (IP) communications with at least one adjacent mobile node.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
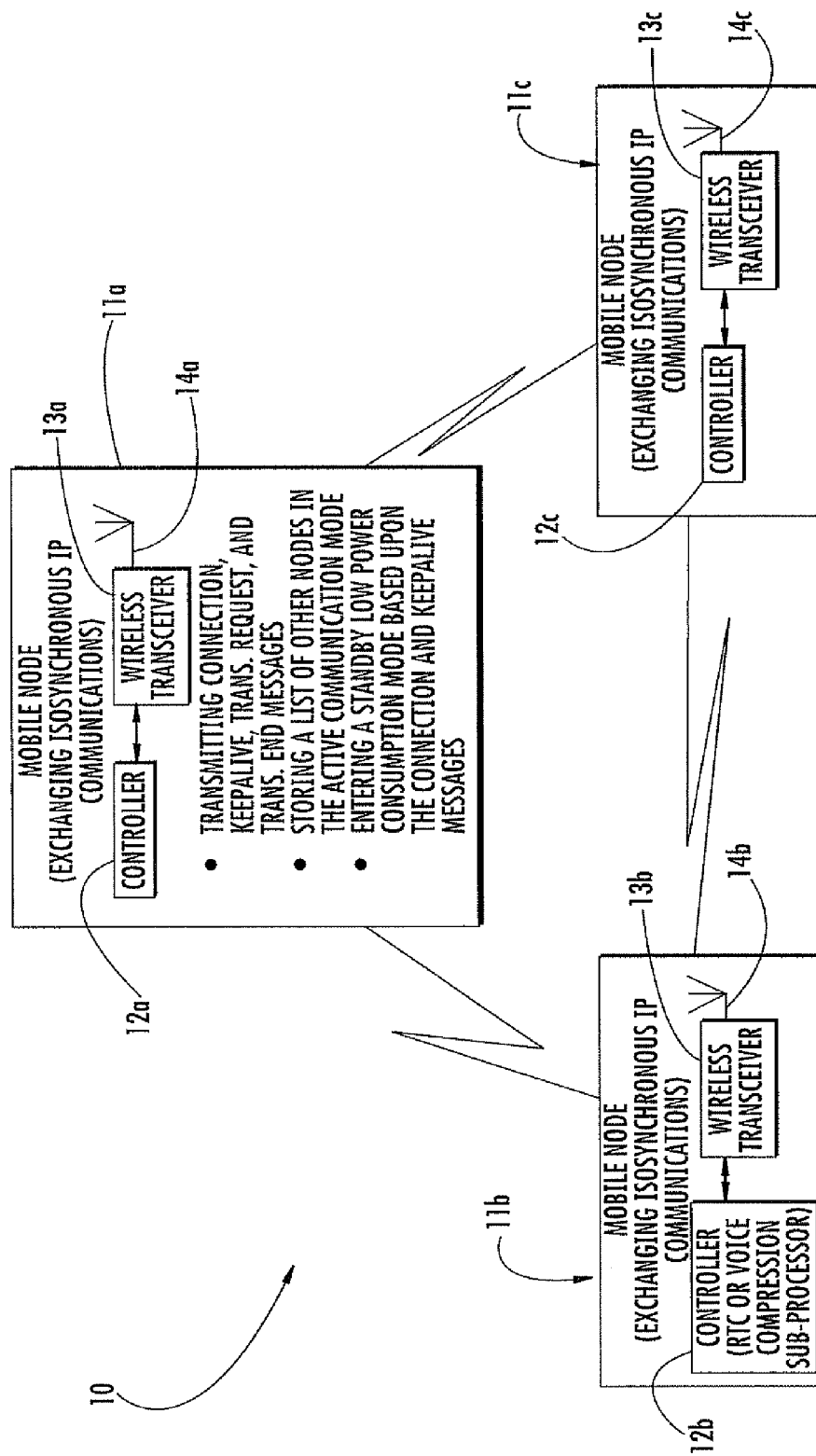
FIG. 1 is a schematic diagram of a MANET according to the present invention.

Referring initially to FIG. 1, a mobile ad hoc network (MANET) 10 illustratively includes a plurality of mobile nodes 11a-11c. Each mobile node 11a-11c illustratively includes a wireless transceiver 13a-13c, a controller 12a-12c cooperating therewith for exchanging isosynchronous Internet Protocol (IP) communications with at least one adjacent mobile node. In other words, the mobile nodes 11a-11c exchange equal/uniform synchronous data communications, i.e. real time voice and video data.

Each mobile node 11a-11c also illustratively includes an antenna 14a-14c coupled to the wireless transceiver 13a-13c. For example, the controller 12a-12c may comprise a real time communications (RTC) subprocessor, or a voice compression codec subprocessor.

As will be appreciated by those skilled in the art, the mobile nodes 11a-11e may include a plurality of differing types of wireless communications devices modified according to the teachings herein, for example, the Falcon III/117G ANW2, or SBR/SPR, as available from the Harris Corporation of Melbourne, Fla., the assignee of the present application. The MANET 10 may also comprise a Mesh network or any network with a changing infrastructure, for example.

The isosynchronous IP communications may comprise at least one of voice communications and data communications. The voice communications may comprise voice over Internet Protocol (VoIP) services. Moreover, the isosynchronous IP communications may be based upon at least one of the Session Initiation Protocol (SIP), the H.323 communications protocol, the Media Gateway Control Protocol (MGCP), and the push-to-talk (PTT) protocol.

As will be appreciated by those skilled in the art, the exchange of digital voice communications uses a constant bit stream flow synchronized with an analog voice input. Advantageously, the mobile nodes 11a-11c of the MANET 10 may exchange isosynchronous voice and data communications with each other. The continuous transmission of isosynchronous communications may include a continuous stream of multiple IP packets with limited latency requirements between received packets.

Figure 2:
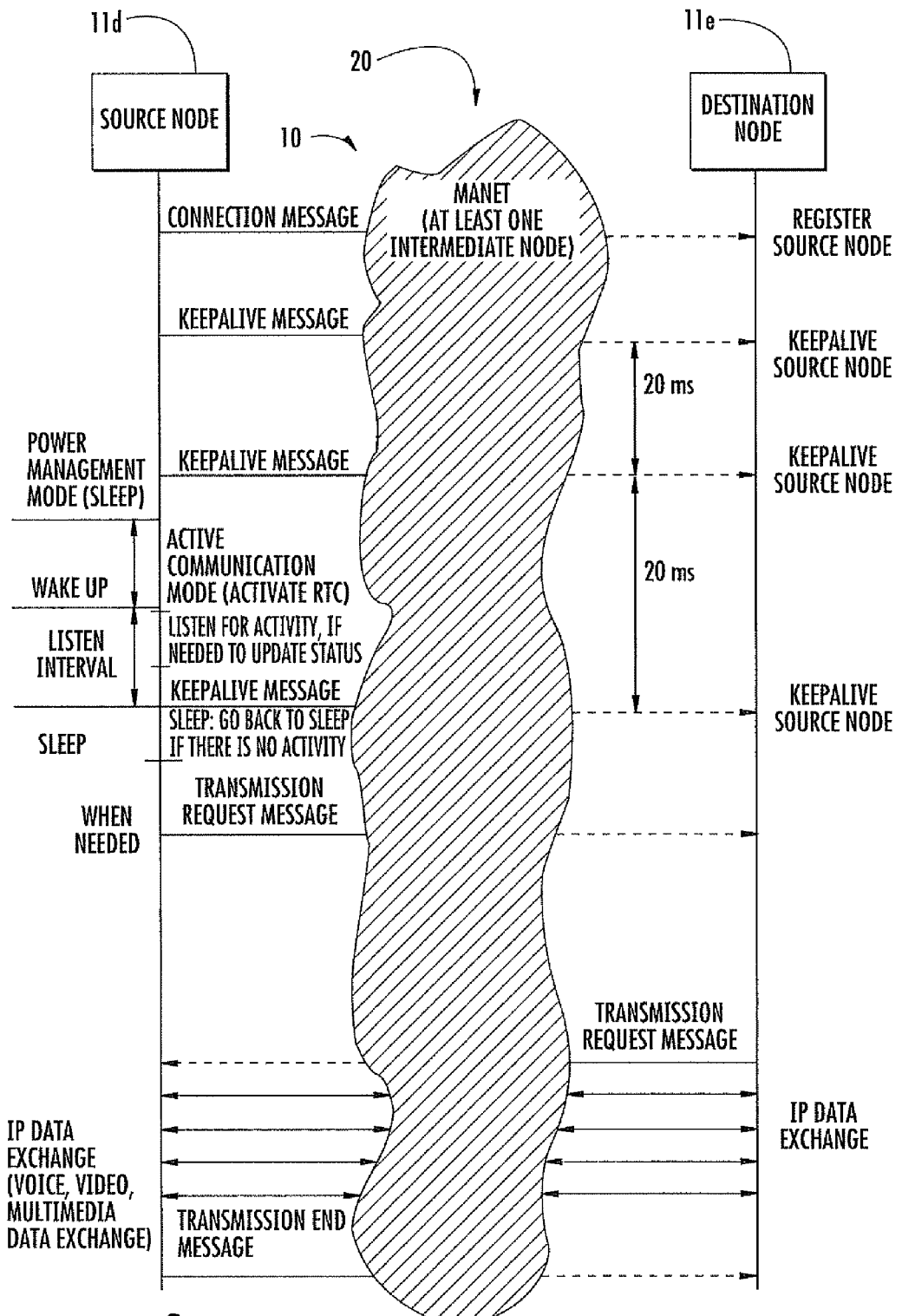
FIG. 2 is a diagram illustrating the operation of the MANET in FIG. 1.

Referring additionally to FIG. 2, a diagram 20 (message sequence diagram) shows the MANET 10 also illustratively including a source node 11d and a destination node 11e. In this diagram 20, the vertical axis represents the time domain and the horizontal axis represents the physical displacement in the MANET 10 between the source node 11d and the destination node 11e via at least one intermediate node.

The wireless transceiver and controller (not shown) of the source node 11d illustratively cooperate to transmit a connection message for registering with the destination node 11e and to enter an active communication mode upon completion of the registering. For transmission of high latency tolerant or best effort data, the connection message may be omitted. Furthermore, any adjacent mobile node within range of the source node 11d may receive the connection message and register the source node 11d. In other words, the source node 11d performs a handshake operation with the MANET 10. Moreover, for mobile nodes outside the transmission range of the source node 11d, the mobile nodes may relay the connection message so that each mobile node in the MANET 10 may receive the connection message. Furthermore, the controllers 12a-12c of the other mobile nodes 11a-11c in the MANET 10 illustratively store a list of other adjacent mobile nodes in the active communication mode based upon the completion of registering and the keepalive messages. As will be appreciated by those skilled in the art, the stored list may be part of a broad QoS management system, i.e. routing tables, in the MANET 10.

Also, once the source node 11d has joined the MANET 10, the wireless transceiver and controller of the source node further illustratively cooperate to periodically transmit a keepalive message to the at least one adjacent mobile node. The time period transmission of keepalive messages is illustratively 20 milliseconds, but may comprise other values that may be based upon network standards and environment. The mobile nodes 11a-11e may update their list of active communication mode mobile nodes based upon the receipt of keepalive messages.

The wireless transceiver 13a-13c and controller 12a-12c of at least one of the plurality of mobile nodes 11a-11c may further cooperate to enter a low power consumption mode when there is limited transmission activity. As will be appreciated by those skilled in the art, the low power consumption mode may be based upon a low power standard. Moreover, in other embodiments, the wireless transceiver 13a-13c and controller 12a-12c of at least one of the plurality of mobile nodes 11a-11c further cooperate to enter a low power consumption mode when no transmission or reception activity occurs for a set period of time, for example, 20 seconds.

When a mobile node 11a-11e decides that it has no voice/data IP communications to transmit, then the mobile node may decide to go into low power consumption mode (Sleep mode). And if the mobile node 11a-11e uses, for example, voice communications in the future, then it wakes up and it may listen to update its network status. The mobile node 11a-11e may periodically exit the low power mode to transmit the keepalive messages. Advantageously, the mobile node 11a-11e simultaneously may be part of the MANET 10 yet independently operate a low power protocol to conserve power.

Each mobile node 11a-11e may include a battery power source (not shown). Advantageously, the low power consumption mode may permit a more robust battery duty cycle. Each mobile node 11a-11e may operate based upon a listen interval for listening for at least one of connection messages, keepalive messages, and transmission request messages. The listen interval may comprise, for example, 1-2 milliseconds and may be based upon network standards and optimal conditions and environments. Upon entering active communication mode, the mobile nodes 11a-11e activate the RTC module.

The MANET may include at least one intermediate node between the source node 11d and the destination node 11e. As will be appreciated by those skilled in the art, the source node 11d may directly communicate with the destination node 11e without the use of intermediate nodes if the nodes are within transmission range of each other.

When the source node 11d has IP data for transmission to the destination node 11e, the source node begins the transmission process by sending a transmission request message by way of the at least one intermediate node to the destination node 11e. As will be appreciated by those skilled in the art, the routing of messages through the MANET 10 may comprise, for example, reactive or proactive routing. Moreover, the routing may be further based upon each mobile nodes 11a-11e stored list of active communications mode nodes.

The destination node 11e illustratively initializes the isosynchronous IP communications with the source node 11d by way of the at least one intermediate node based upon receipt of the transmission request message. Additionally, the initialization of isosynchronous communications may be further based upon transmitting of the transmission confirmation message by the destination node 11e in reply to the transmission request message. Upon receipt of the transmission confirmation message, the source node 11d begins transmission of IP data with the destination node 11e.

Additionally, the source 11d node illustratively sends a transmission end message by way of the at least one intermediate node to end the isosynchronous IP communications with the destination node 11e. Alternatively, the destination node 11e may send the transmission end message to the source node 11d. Advantageously, the exchange of isosynchronous IP data may alternatively allow for bandwidth sharing at each mobile node 11a-11e rather than dedicated bandwidth allocation.

Figure 3:
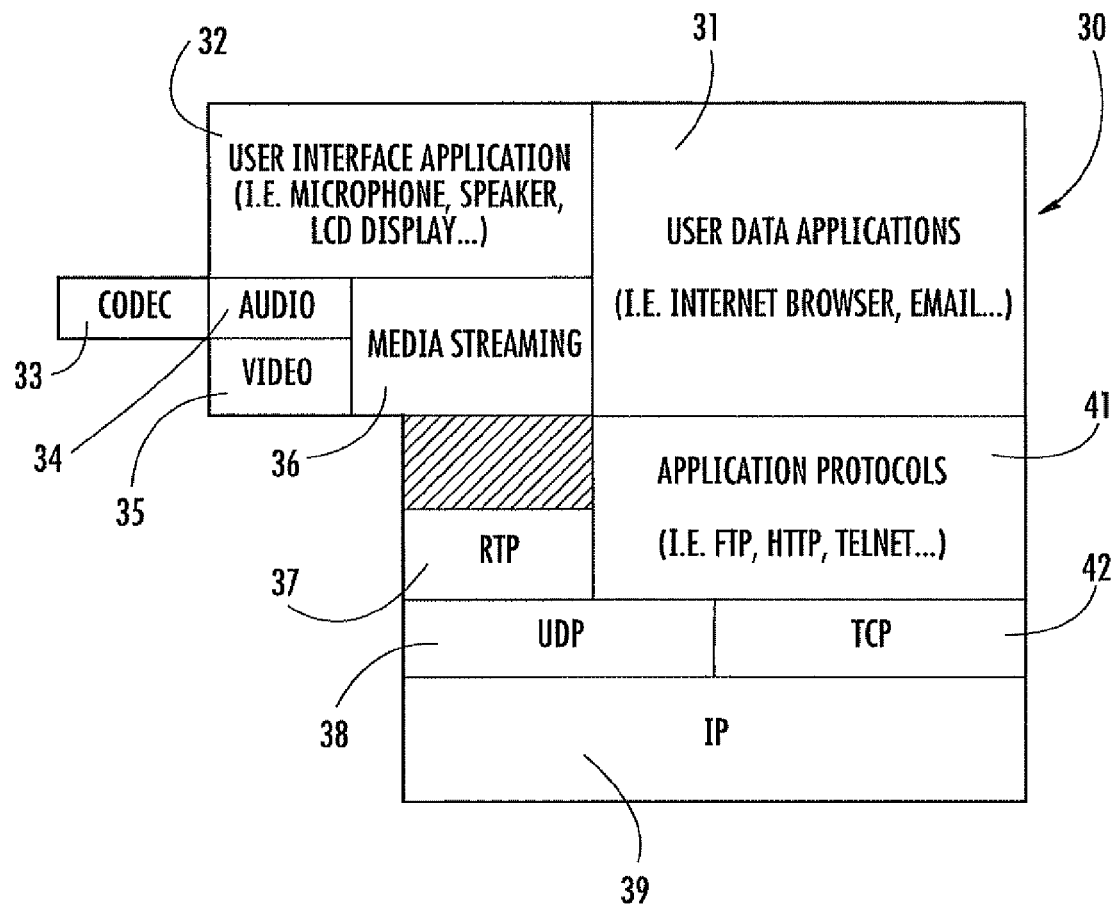
FIG. 3 is a schematic diagram of a protocol stack used by the MANET in FIG. 1.

Referring additionally to FIG. 3, a protocol stack 30 for providing end-to-end network transport functions in the MANET 10 is shown. The Real-time Transport Protocol (RTP) stack 30 may provide service for applications transmitting real time data, such as, voice and video. Based upon Internet Engineering Task Force (IETF), International Telecommunication Union (ITU), or Institute of Electrical and Electronics Engineers (IEEE) standards, the MANET 10 uses Open Systems Interconnection Basic Reference Model/International Organization for Standardization (OSI/ISO) network layers implemented on top of a User Datagram Protocol (UDP), Real-time Streaming Protocol (RTSP), RTP and/or the Real-time Transport Control Protocol (RTCP). These protocols may be used to stream multimedia, for example, voice and video, over networks.

As will be appreciated by those skilled in the art, these software modules coupled with the platform/operating system specific multimedia streaming and the encoder/decoder (i.e. for voice CODEC using G.711 method or for video using MPEG method) provide the "clocking" of the isosynchronous communications. For example, in VoIP, the MANET 10 generates samples of voice frames by the CODEC, i.e. every 20 milliseconds using G.716, which then are encapsulated as data payload into an IP packet.

The protocol stack 30 illustratively includes a user interface application layer 32, a codec layer 33, an audio 34 and video layer 35 below the user interface application layer, a media streaming layer 36 also below the user interface application layer, and an user data applications layer 31 adjacent the user interface application layer. The protocol stack 30 also illustratively includes an applications protocol 41 layer below the user data applications layer 31, and a Transmission Control Protocol (TCP)/Internet Protocol (IP) 42, 39 layer below the applications protocol layer 41. The protocol stack 30 illustratively includes a RTP layer 37 and a UDP layer 38 below the media streaming layer 36.

Another aspect is directed to a method for operating a mobile node 11a-11c in a MANET 10. The mobile node 11a-11b may comprise a wireless transceiver 13a-13c, and a controller 12a-12c cooperating therewith. The method may include exchanging isosynchronous IP communications with at least one adjacent mobile node.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A mobile ad hoc network (MANET) comprising:
a plurality of mobile nodes;
each mobile node comprising a wireless transceiver and a controller cooperating therewith for
exchanging isosynchronous Internet Protocol (IP) communications with at least one adjacent mobile node,
transmitting a connection message for registering with the at least one adjacent mobile node and entering an active communication mode upon completion of the registering, and
periodically transmitting a keepalive message to the at least one adjacent mobile node.

2. The MANET according to claim 1 wherein said controller stores a list of other adjacent mobile nodes in the active communication mode based upon the completion of registering and the keepalive message.

3. The MANET according to claim 1 wherein said plurality of mobile nodes comprises a source node, a destination node, and at least one intermediate node therebetween; wherein said source node transmits a transmission request message by way of said at least one intermediate node to said destination node; and wherein said destination node initializes the isosynchronous IP communications with said source node by way of said at least one intermediate node based upon receipt of the transmission request message.

4. The MANET according to claim 3 wherein at least one of said source and destination nodes sends a transmission end message by way of said at least one intermediate node to end the isosynchronous IP communications.

5. The MANET according to claim 1 wherein said controller comprises a real time communications (RTC) subprocessor.

6. The MANET according to claim 1 wherein said controller comprises a voice compression codec subprocessor.

7. The MANET according to claim 1 wherein the isosynchronous IP communications comprise at least one of voice communications and data communications.

8. A mobile node for a mobile ad hoc network (MANET) comprising:
a wireless transceiver; and
a controller cooperating with said wireless transceiver for exchanging isosynchronous Internet Protocol (IP) communications with at least one adjacent mobile node,
transmitting a connection message for registering with the at least one adjacent mobile node and entering an active communication mode upon completion of the registering, and
periodically transmitting a keepalive message to the at least one adjacent mobile node.

9. The mobile node according to claim 8 wherein said controller stores a list of other adjacent mobile nodes in the active communication mode based upon the completion of registering and the keepalive message.

10. A method for operating a mobile node in a mobile ad hoc network (MANET), the mobile node comprising a wireless transceiver, and a controller cooperating therewith, the method comprising:
exchanging isosynchronous Internet Protocol (IP) communications with at least one adjacent mobile node;
transmitting a connection message for registering with the at least one adjacent mobile node and entering an active communication mode upon completion of the registering; and
periodically transmitting a keepalive message to the at least one adjacent mobile node.

11. The method according to claim 10 further comprising:
storing a list of other adjacent mobile nodes in the active communication mode based upon the completion of registering and the keepalive message.

12. The method according to claim 10 wherein the MANET comprises a source node, a destination node, and at least one intermediate node therebetween; and further comprising:
transmitting from the source node a transmission request message by way of the at least one intermediate node to the destination node; and
initializing the isosynchronous IP communications with the source node by way of the at least one intermediate node based upon receipt of the transmission request message.

13. A mobile ad hoc network (MANET) comprising:
a plurality of mobile nodes;
each mobile node comprising a wireless transceiver and a controller cooperating therewith for
exchanging isosynchronous Internet Protocol (IP) communications with at least one adjacent mobile node,
transmitting a connection message for registering with the at least one adjacent mobile node and entering an active communication mode upon completion of the registering,
periodically transmitting a keepalive message to the at least one adjacent mobile node, and
storing a list of other adjacent mobile nodes in the active communication mode based upon the completion of registering and the keepalive message;

said wireless transceiver and controller of at least one of said plurality of mobile nodes further cooperating to enter a low power consumption mode when the keepalive message is not received during a set period of time.

14. The MANET according to claim 13 wherein said plurality of mobile nodes comprises a source node, a destination node, and at least one intermediate node therebetween; wherein said source node transmits a transmission request message by way of said at least one intermediate node to said destination node; and wherein said destination node initializes the isosynchronous IP communications with said source node by way of said at least one intermediate node based upon receipt of the transmission request message.

15. The MANET according to claim 14 wherein at least one of said source and destination nodes sends a transmission end message by way of said at least one intermediate node to end the isosynchronous IP communications.

16. The MANET according to claim 13 wherein said controller comprises a real time communications (RTC) subprocessor.

17. A method for operating a mobile node in a mobile ad hoc network (MANET), the mobile node comprising a wireless transceiver, and a controller cooperating therewith, the method comprising:
exchanging isosynchronous Internet Protocol (IP) communications with at least one adjacent mobile node;
transmitting a connection message for registering with the at least one adjacent mobile node and entering an active communication mode upon completion of the registering;
periodically transmitting a keepalive message to the at least one adjacent mobile node;
storing a list of other adjacent mobile nodes in the active communication mode based upon the completion of registering and the keepalive message; and
entering a low power consumption mode when the keepalive message is not received during a set period of time.

18. The method according to claim 17 wherein the MANET comprises a source node, a destination node, and at least one intermediate node therebetween; and further comprising:
transmitting from the source node a transmission request message by way of the at least one intermediate node to the destination node; and
initializing the isosynchronous IP communications with the source node by way of the at least one intermediate node based upon receipt of the transmission request message.

* * * * *